March 29, 1955 B. F. MIESSNER 2,704,957

RADIO FREQUENCY, ELECTRO-DYNAMIC PICK-UP SYSTEM

Filed Dec. 9, 1950 4 Sheets-Sheet 1

BENJAMIN F. MIESSNER
INVENTOR.

BY
Gayle, Cifelli & Jurick
ATTORNEYS

March 29, 1955 B. F. MIESSNER 2,704,957

RADIO FREQUENCY, ELECTRO-DYNAMIC PICK-UP SYSTEM

Filed Dec. 9, 1950 4 Sheets-Sheet 2

BENJAMIN F. MIESSNER
INVENTOR.

BY
Gayle, Cifelli & Juick
ATTORNEYS

March 29, 1955 B. F. MIESSNER 2,704,957

RADIO FREQUENCY, ELECTRO-DYNAMIC PICK-UP SYSTEM

Filed Dec. 9, 1950 4 Sheets-Sheet 3

BENJAMIN F. MIESSNER
INVENTOR.

BY Gaylor, Alfelli & Junick
ATTORNEYS

BENJAMIN F. MIESSNER
INVENTOR.

BY
Gaylor, Cifelli & Jurick
ATTORNEYS

United States Patent Office 2,704,957
Patented Mar. 29, 1955

2,704,957

RADIO FREQUENCY, ELECTRO-DYNAMIC PICK-UP SYSTEM

Benjamin F. Miessner, Harding Township, Morris County, N. J., assignor to Miessner Inventions Inc., Harding Township, Morris County, N. J., a corporation of New Jersey Application December 9, 1950, Serial No. 200,024

6 Claims. (Cl. 84—1.15)

This invention relates to translating systems for use in electronic musical instruments and more particularly to a novel arrangement for converting mechanical vibrations into corresponding electrical oscillations.

In my co-pending United States patent application, Serial No. 169,714 filed June 22, 1950, I disclose translating systems, suitable for use with essentially pendularly vibrating reeds, of the electrostatic, electro-magnetic and photo-electric types. The present invention is based upon the electro-dynamic principle wherein the inductance of a radio frequency current-carrying element is modulated by a vibrating reed to thereby modulate the frequency of a radio frequency oscillator in whose circuit this inductance is included.

Reference is also made to my United States Patent No. 2,273,975, issued February 24, 1942, wherein there is disclosed, in Figures 2 and 3, an electro-dynamic R. F.-F. M. translator of another type adapted particularly for linearly translating the motion of a vibratory reed. Here the reed is air blown for steady tone generation and the pickup is of the linear type, an arrangement suitable for organ-like tones. Such linear translating system is not adapted for the generation of Fourier series components or for producing tones of low damping rates from undamped vibrators. The pickup arrangements, to be described herein, are, on the other hand, well suited for producing such tones which, incidentally, are characteristic of the general piano tone class.

An object of this invention is the provision of a novel pickup arrangement for translating vibrations of a vibrator into corresponding electrical oscillations.

An object of this invention is the provision of a tone generator for electronic musical instruments and comprising an inductive loop spaced from a conductive vibrator.

An object of this invention is the provision of a translating arrangement for translating mechanical vibrations into corresponding electrical oscillations by variation in the mutual inductance between the vibrator and an associated inductive loop.

An object of this invention is the provision of an arrangement for producing asymmetrical electrical waves in response to essentially sinusoidal vibrations of a mechanical vibrator.

An object of this invention is the provision of a translating system comprising a conductive mechanical vibrator, an inductive loop associated with the vibrator and means for varying the relative position of the loop and vibrator.

An object of this invention is the provision of a tone generator for an electronic musical instrument comprising a base, a series of vibratory reeds mounted upon the base, a loop of conducting material spaced from the vibratory ends of the reeds, a radio frequency oscillator, and circuit elements connecting the loop of conducting material into the grid circuit of the oscillator.

An object of this invention is the provision of a musical tone generator comprising a mechanical vibrator of conductive material, a conductive loop magnetically coupled to the vibrator, a radio frequency oscillator, circuit elements connecting the loop to the frequency-determinating circuit of the oscillator, and an electro-acoustic translator connected to the output of said oscillator.

An object of this invention is the provision of a musical tone generator comprising a mechanical vibrator of conductive material, a conductive loop magnetically coupled to the vibrator, a source of electrical energy connected to the loop through a transformer primary winding, and an electro-acoustic translator responsive to the secondary voltage of the transformer.

An object of this invention is the provision of an instrument of the harmonica type wherein the reed plates serve as an inductive loop for translating reed vibrations into corresponding electrical oscillations.

An object of this invention is the provision of a rotating type tone generator comprising a toothed-rotor associated with an inductance loop carrying an R. F. current.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views.

Figure 1:
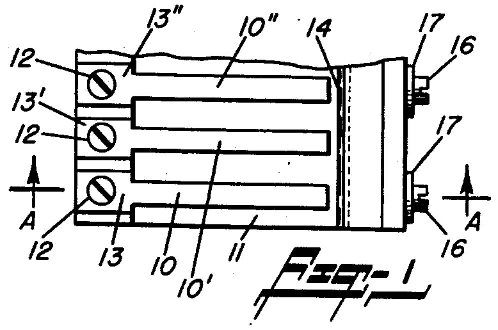
Figure 1 is a fragmentary plan view showing a series of vibratory reeds and a pick-up loop made in accordance with this invention.
Figure 2:
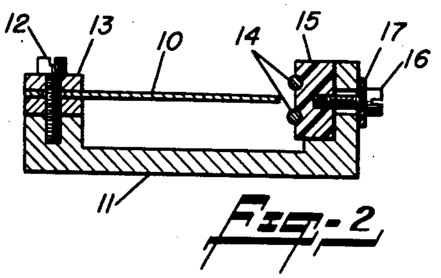
Figure 2 is a cross-sectional view taken along the line A—A of Figure 1.

Reference is now made to Figures 1 and 2, wherein there is shown a series of tuned reeds 10, 10', 10'' secured to a mounting base 11 by the screws 12 passing through the individual reed lugs 13, 13', 13''. The reeds are made of a suitable conductive material, such as beryllium copper, and have their ends spaced from a wire loop 14 that is embedded in, or otherwise carried by, an insulator plate 15 that is adjustably secured to the base 11 by the screws 16 and cooperating washers 17. It may here be pointed out that a full complement of tuned reeds, secured to the reed block, may be provided to produce the full range of tone frequencies within the range of a given musical instrument such as, for example, a piano, and the pickup loop 14 extends the full extent of such reed bank. The free end of each reed is adapted for vibration close to the dual-conductor loop.

Figure 3:
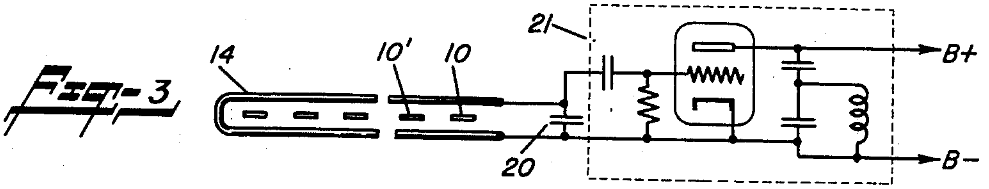
Figure 3 is a schematic representation showing the conductor loop connected into an oscillator circuit.

As shown in Figure 3 the pickup, comprising the conducting loop 14, may be connected in parallel with a fixed capacitor 20 to form an oscillator circuit for inclusion in the grid circuit of a radio frequency oscillator generally identified by the numeral 21.

Figure 4:
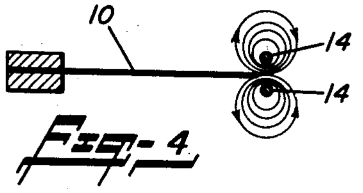
Figure 4 is an elevation section of a reed and the wire loop.
Figure 5:
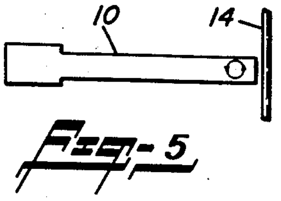
Figure 5 is a plan view of such reed and loop.

Figure 4 shows, in elevation section, the reed and the two (2) radio frequency current-carrying conductors of the inductance loop, and the form of the symmetrical, instantaneous electro-magnetic field about the loop conductors. It is seen that along a plane midway between the two conductors, the magnetic fields of the wires (carrying currents in opposite directions), are completely neutralized. As long as the reed tip lies in such plane it will have no mutual inductance with the loop. When, however, the reed tip is displaced, as when vibrated, so that it lies further from the one conductor than the other, there is an unbalanced coupling in favor of the nearest loop wire. Consequently, the radio frequency current in such wire, that is nearest to the reed, will induce an eddy current in the reed, such current circulating in the flat plane of the reed, as shown in Figure 5. The instantaneous direction of this circulating radio frequency current, of course, reverses when the reed position is reversed, that is, when the reed lies nearest to the other wire of the loop. In the position shown, where the at rest position of the reed is in the plane that is equi-distant from the two wires of the loop, there will occur two increases of mutual inductances per cycle of reed vibration. These will produce two equi-amplitude shifts of oscillator frequency so that, after demodulation, the reed vibration will appear as a frequency-doubled voltage or current.

Figure 6:
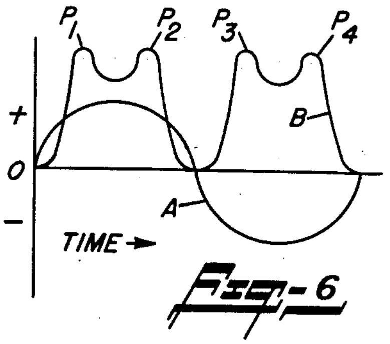
Figure 6 illustrates the variation of the mutual inductance between the loop wires and the reed relative to one cycle of reed vibration.
Figure 7:
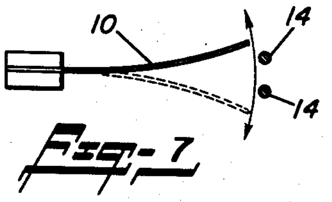
Figure 7 illustrates a reed vibration amplitude wherein the reed tip passes substantially beyond the loop wires, producing sharp peaks in the mutual inductance curve, as shown in Figure 6.

The frequency-doubling character of the Figure 4 arrangement is illustrated in Figure 6 for one cycle of reed vibration. The reed vibration curve is identified by the letter A and the curve of the mutual inductance between the loop wires and the reed tip by the letter B. These curves are produced when the amplitude of the reed vibration is such that the reed tip passes substantially beyond the point of minimum distance between it and the loop wire, as shown in Figure 7. The peaks $P_1$, $P_2$, $P_3$ and $P_4$ on the mutual inductance curve correspond to the points in the oscillation cycle of the reed where the distances between the reed tip and the wire of the loop are a minimum and equal. The actual amplitudes of such mutual inductance peaks will vary with the actual separation between the reed tip and the wires and the sharpness of these peaks will vary with the velocity of the reed tip motion in the vicinity of the wires, with the separation between the reed tip and the wires at the point of closest approach, and with the separation between the wires themselves. Further, the separation of these inductance peaks, along the time axis, will depend upon the amplitude of the reeds over-all vibrations and the separation between the loop wires. It will be apparent that when the wire loop is connected into an oscillator circuit the degree of frequency modulation (upward in absolute frequency) of the radio frequency oscillator will follow, in a general manner, this mutual inductance curve.

Figure 8:
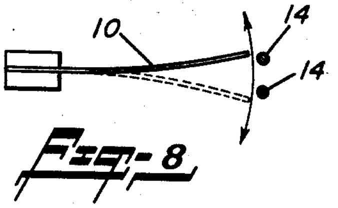
Figures 8, 10 and 12 illustrate progressively smaller maximum reed vibration amplitudes.
Figure 9:
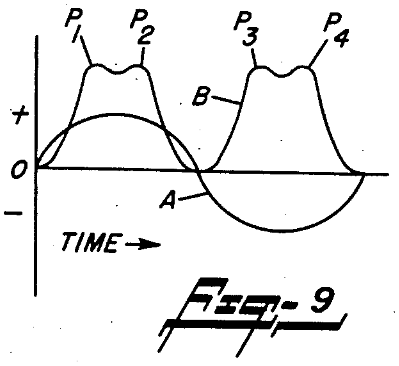
Figures 9, 11 and 13 are curves similar to those shown in Figure 6 for the reed vibration amplitudes shown in Figures 8, 10 and 12, respectively.

If the maximum reed vibration amplitude is such that the reed tip passes just slightly beyond the individual loop wires, as shown in Figure 8, the peaks of the mutual inductance curve will be flatter and spaced closer together, as shown in Figure 9.

Figure 10:
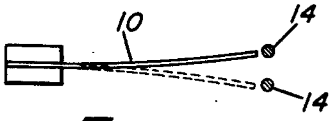
Figure 11:
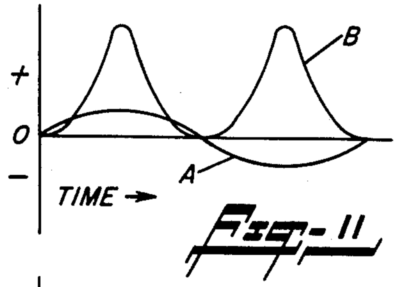
Figure 12:
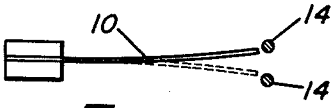

Figure 10 illustrates a reed vibration amplitude equal to the separation of the wire loop resulting in the curve shown in Figure 11. It is to be noted that as long as the reed tip vibrates up to its maximum possible spacing from the loop wires, the amplitude of the mutual inductance will always ascend to a fixed maximum, as shown in Figures 6, 9 and 11. If, however, the reed amplitude is less than this magnitude, as shown in Figure 12 and the resulting curves of Figure 13, then the peaks of the inductance curve will be in phase with the reed motion and of lower amplitude.

Figure 13:
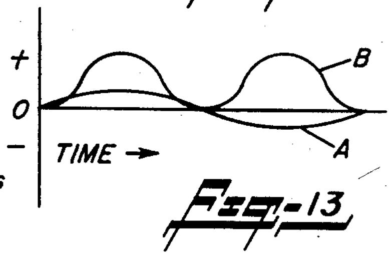

If, now, the loop is displaced with respect to the at rest position of the reed such that upon reed vibration the tip of the reed sweeps beyond one of the loop wires in one direction and just to the other loop wire in the reverse direction, a combination of the curves shown in Figures 6 and 13 is obtained. Specifically, motion of the reed in one direction (say the positive, half-cycle of the curve A) will produce a mutual inductance curve having the dual peaks $P_1$ and $P_2$ of Figure 6, and the negative half-cycle of the reed vibration will produce a relatively flat, single peak curve as shown in Figure 13. Such curve includes a fundamental frequency corresponding to the fundamental of the reed vibration plus other odd and even components.

It will now be apparent that variation of the wire spacing, within the limits of the over-all maximum reed vibration amplitude, will serve to vary the shape of the mutual inductance wave form and, thus, to vary the output tone quality. Also, since the decadent vibration of the reed constantly changes, the wave form of the mutual inductance curve changes continuously from maximum to minimum reed vibration.

It is here pointed out that the above curves of the varying mutual inductance, in response to reed vibration, are asymmetrical and, therefore, they contain both odd and even Fourier components. The harmonic content of the curves increases with reed vibration amplitude due both to increased peaking and to the closer spacing of the peaks. The fundamental frequency of such curves is generally, twice that of the reed.

Figure 14:
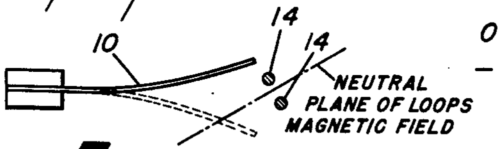
Figures 14, 16 and 18 are similar to Figures 7, 10 and 12, respectively, but showing the neutral plane of the magnetic field of the loop displaced at an angle with respect to the plane of the vibratory reed in the at rest position.
Figure 16:
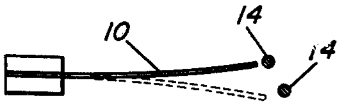
Figure 15:
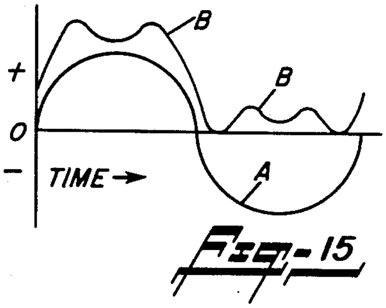
Figures 15, 17 and 19 show the reed vibration curve and the curve of the mutual inductance for the specific arrangements shown in Figures 14, 16 and 18.
Figure 18:
Figure 17:
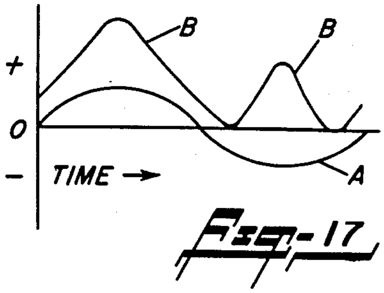
Figure 19:
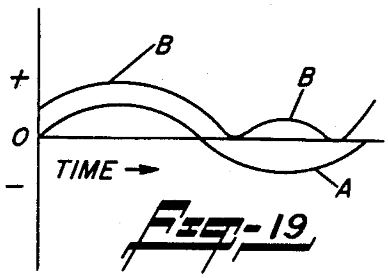

If the neutral magnetic plane of the magnetic field of the loop is displaced at an angle with reference to the reed when the latter is in the at rest position, the action will still be of an asymmetric character and other than doubled-frequency components will appear in the demodulated output of the oscillator or separate discriminator. Figures 14, 16 and 18 illustrate, by way of examples, such angular displacement of the neutral magnetic plane from the reed and three different reed vibration amplitudes. The curves of Figures 15, 17 and 19 show, respectively, the corresponding reed motion curve A, and the mutual inductance curve B. Due to the asymmetrical disposition of the two wires of the loop on the plus and minus sides of the reeds vibration axis, the mutual inductance curves also are asymmetric and contain both odd and even components. These components increase in number and amplitude at higher and higher reed vibration amplitudes so that the output tone becomes more and more strident, as is desired. For securing adjustability of the output tone quality, therefore, the plane joining the two wires of the loop may be rotated within an angle of about 90 degrees, as shown diagrammatically in Figures 20, 21. Adjustment of the loop position, in a direction normal to the vibration axis of the reed, and the spacing between the two wires forming the loop, provide further variations in tone quality and output tone damping.

In the above arrangements, there is mutual inductance between the loop and the reed and a circulating current will flow in the reed at the tip thereof. Such current results in a decrease in the inductance of the loop and a consequent increase in the frequency of the oscillations of the R. F. oscillator. Vibrations of the reed, therefore, modulate the oscillator R. F. frequency at the vibrator audio frequency.

Since, further, the line of demarcation between coupling and no coupling between the reed and the loop becomes very sharp at a point in the neutral plane near the loop wires, it is possible to provide very abrupt changes, between zero and large coupling, by suitable orientation of this neutral plane with respect to the at rest position of the reed.

The two parallel wires comprising the pickup loop may be mounted quite close together, whereby the total inductance of such loop, having a length of several feet, will be small enough to allow fairly high oscillation frequency in an oscillator in one of whose frequency-determining circuits this loop forms the total inductance.

In the position for lowest output tone damping, the reed will be removed from the neutral magnetic plane of the pick-up loop by a distance equal to approximately one-half (½) of the reed thickness, and such neutral magnetic plane will be inclined somewhat to the normal, central, at rest plane of the reed. By such asymmetrical arrangement the translated vibrations will contain both even and odd Fourier partials. Large amplitudes of reed vibration develop high Fourier partials.

My electro-dynamic, radio frequency, frequency modulation, pickup system is, therefore, a counterpart of the capacitative, radio frequency, frequency-modulation pickup, so far as concerns output tone quality. That the sensitivity of my novel system is high is indicated by the fact that with some normal coupling between all reeds and the wire loop, the loop inductance is considerably lower than when the reeds are absent. Consequently, when a given reed is fully coupled by a small displacement from its normal at rest position, it sets up a very material reduction in the total loop inductance and, therefore, a very material change in the oscillator frequency. In general terms, of course, the sensitivity of such a vibration translating system increases with the absolute frequency of the R. F. oscillator. Also, the closer the reed tip comes to the center of the wires of the pickup loop, the higher the coupling and the higher the translation efficiency. This factor indicates the use of small diameter wires and small separation between them. Alternatively, the pickup loop may be made of thin-strip conductors 14', as shown in Figure 22, to obtain sharper peaking of the mutual inductance curve.

My dual-wire loop arrangement is not restricted to use in radio frequency, frequency modulation translating systems. Figure 23 illustrates, diagrammatically, an electro-dynamic D. C. translating system. The vibratory reeds 10, 10', 10'', are coupled to the conductor loop 14 which carries a steady direct current supplied by the source 25. Such current flows through the series circuit comprising the resistance 26, the loop 14 and the primary of an audio frequency transformer 27. When vibrating, the reeds will develop circulating currents near their tips as such tips cut the magnetic flux field established by the current flow through the loop. If the D. C. source has a poor regulation, or if a resistance be included, as shown, the development of the circulating currents in the reeds extracts energy from the loop circuit resulting in a decrease in loop current. The reed vibrations, therefore, by reaction on the loop, modulate the loop current and this induces a higher alternating voltage in the secondary of the audio frequency transformer. The secondary voltage of this transformer may be employed for the direct actuation of an electro-acoustic device, or a suitable amplifying arrangement may be used for this purpose, to produce audible tones corresponding to the frequency of the vibrating reed or reeds.

Figures 20, 21, 22, 23, 24, 25, 26, 27, 28, 29:
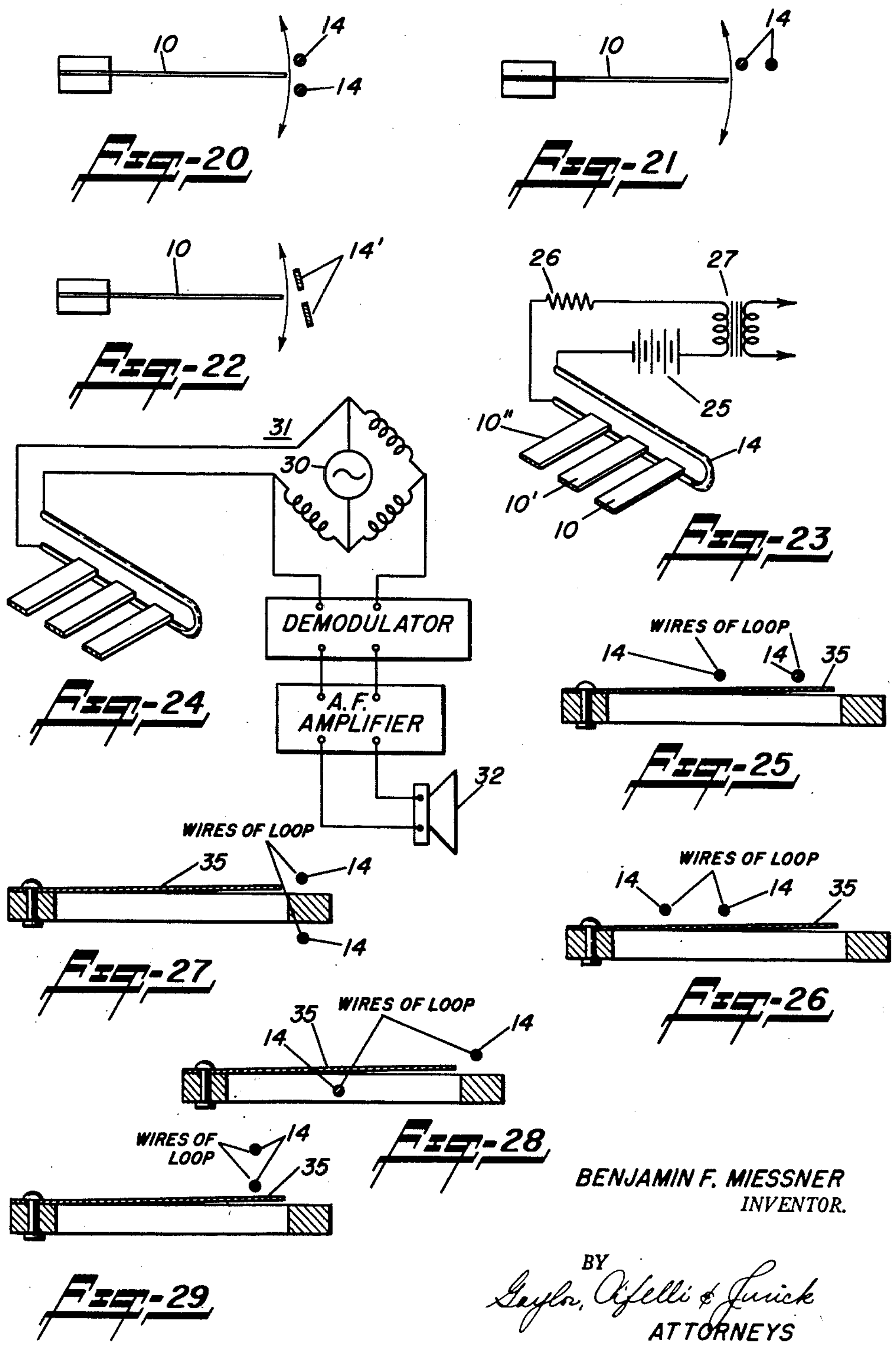
Figures 20, 21 illustrate the range of angular adjustment of the wire loop relative to the plane of the reed, to obtain desired tone control.
Figure 22 illustrates a wire loop made of thin strip conductors to achieve a sharper peaking of the mutual inductance curve upon reed vibration.
Figure 23 illustrates my pickup loop employed in an electro-dynamic, D. C. translating system.
Figure 24 illustrates an arrangement wherein the conducting loop serves as a variable inductive reactance in an R. F. bridge circuit for mechanical vibration translating purposes.
Figures 25 to 29 are elevation sections taken through an air-blown reed and showing the numerous possible positions for the conductive loop pickup relative to such reed.

Figure 24 illustrates an arrangement wherein the conducting loop serves as a variable inductive reactance included in an R. F. bridge circuit for the modulation of an R. F. current. An R. F. oscillator 30 provides energy for the R. F. bridge 31, one arm of the bridge being the loop 14 magnetically coupled to the vibratory reeds. The reed vibrations modulate the inductive reactance of the loop which unbalances the normally-balanced R. F. bridge, and results in modulation of the amplitude of the R. F. current fed to the demodulator and, of course, the amplitude of the output tone of the loudspeaker 32.

For sustained tone-generating vibrators, such as the air-stream reeds of organs, accordions or harmonicas, these principles of mutual-inductance-modulation translating systems have special applications. The pickup loop wires may be variously located with respect to the reeds, in such positions as have already been illustrated and described, or opposite one or both of the flat sides of the reeds. Figures 25 to 29, which are elevation sections taken through an air-blown reed 35 and the wire loop 14, illustrate several such relative dispositions of the loop and reed, by way of example. Each such arrangement yields a different type of output tone and it will be apparent other specific arrangements may be used.

Figure 30:
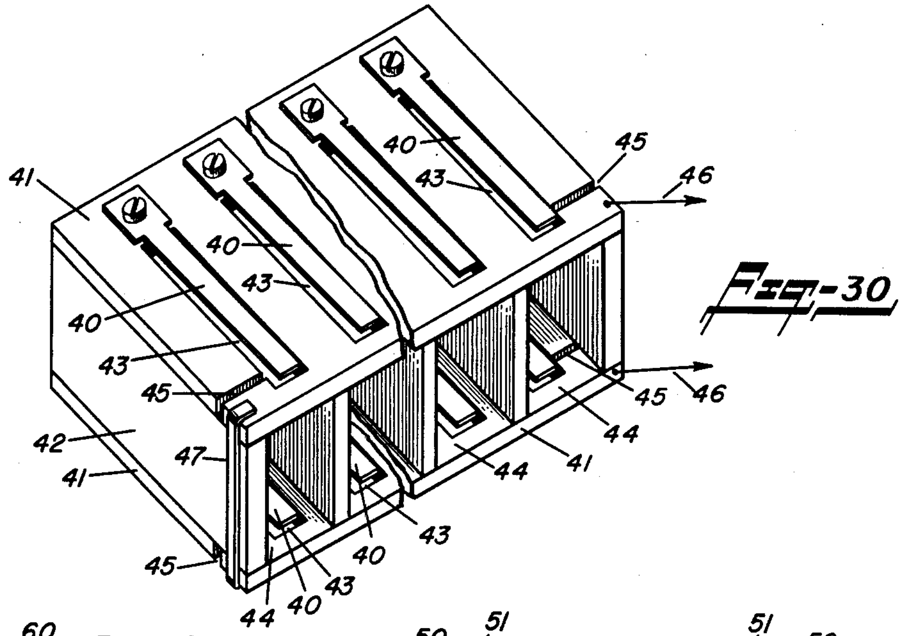
Figure 30 is an isometric view of a harmonica illustrating the application of my inductive-loop to such instrument for electronic amplification of the vibratory reed tones.

In an instrument such as the harmonica, where the vibratory reeds are attached to, and vibrate through slot apertures in, a pair of reed plates of conductive material, such plates may serve as the loop conductors. Figure 30 is an isometric view of a harmonica with the cover plates removed. The vibratory reeds 40 are individually secured to one or the other plates 41 that are spaced apart by a frame 42 of wood, plastic or etc. Each of the plates 41, made of metal, includes a series of apertures 43 within which the end of the reed vibrates in response to air blown or drawn through the aligned parts 44, it being well known that the reeds are so positioned with respect to the associated apertures that those carried by one plate operate in response to increased air pressure in the port whereas those on the other plate vibrate in response to a reduced pressure in such port. The plates 41 are, of course, electrically insulated from each other but they are provided with narrow slits 45 to confine the R. F. (or other) current to that side of the reed plates near the tips of the reeds, when the plates are connected to such circuit as by the leads 46. A strap 47, of conducting material, is soldered or otherwise secured to each of the plates, at one end thereof, whereby the plates form the conductive loop. It may be pointed out that this type of translating system has an extremely low A. F. impedance and, since it is inductive and affected only by the vibratory coupling of relatively high conductivity materials, it will be unaffected by condensation of water vapor from the player's breath or by saliva. Further, since the system is electro-dynamic in action, it, unlike magnetic types of pickup, does not require the use of magnetic materials in the reeds. In fact, the reeds can be made of any conductive materials but, in general, magnetic materials will yield higher translation efficiencies. Magnetic materials will introduce additional effects into the wave forms of the A. F. frequency or amplitude modulations since the magnetic effects will tend further to lower the oscillator frequency in the face of reduced oscillator frequency brought about by the circulating currents induced in the vabrating reeds. Various ratios of magnetic to eddy current effects will, therefore, yield varying output tone forms. In some cases these two effects may even neutralize one another so that if such neutralization occurs only at certain reed vibration amplitudes, marked changes in the A. F. wave form of the R. F. frequency modulations will be produced. Such variations are included within the scope of the present invention.

The principles of my electro-dynamic pickup may also be applied to vibratory strings, in which case the loop wires preferably are placed above or below the plane of the strings and in a direction approximately at right angles to the strings. The two sides of the loop may be disposed on the same side relative to the string, or on opposite sides of the string and at points which lie adjacent to different partial amplitudes of vibration. Further, the two loop sides may be placed on opposite sides of the string but at different distances from the string axis, to thereby achieve asymmetric pickup at one point having a given ratio of amplitudes among the string vibration partials.

It is understood, therefore, that the herein disclosed principles and arrangements are applicable to any type of physical vibrator and, in fact, even to rotary devices. In devices of the latter class, a conductor moves periodically to and from a current-carrying conductor of the loop so as to vary the mutual inductance between the conductor (acting as an induced, eddy current conductor) and the loop wire carrying a D. C. or preferably, an R. F. current.

Figure 31:
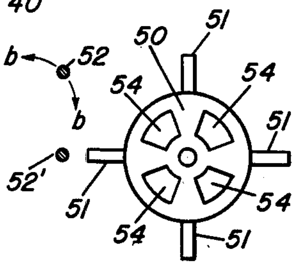
Figure 31 is an end elevation showing a rotor provided with radially-projecting conductor plates that cooperate with my loop pickup for the generation of a musical tone.
Figure 32:
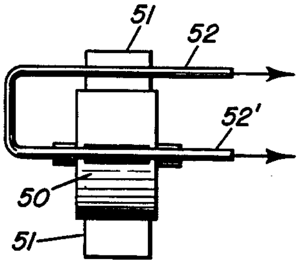
Figure 32 is a side elevation of the Figure 31 arrangement.

Referring now to Figures 31 and 32, the rotor 50 is provided with the radially-projecting metal plates 51 and the conductive loop comprises the wires 52, 52', connected to an R. F. source. Upon rotation of the rotor the plates sweep past the wires 52, 52' varying the mutual inductance therebetween and modulating the current flowing in the loop. It will be apparent the one wire of the loop may be rotated about an axis formed by the other wire, as indicated by the directional arrows *b*, *b*, to vary the wave form of the mutual inductance variation. As shown in Figure 31, the mass of the rotor may be reduced by removing some of the material as indicated by the segmental apertures 54.

Figure 33:
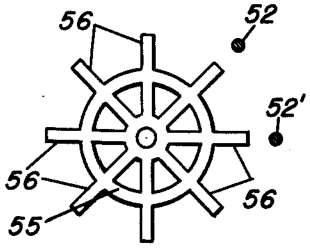
Figure 33 is similar to Figure 31 and showing a symmetrical disposition of the loop wires relative to the rotor plates to provide additive effects with respect to variation of the mutual conductance between the loop and the plates.

Figure 33 is similar to Figure 31 but shows a rotor 55 with a great number of projecting plates 56. Also, the two wires, 52, 52', of the loop are spaced apart a distance equal to the peripheral spacing of the plates 56 and the radial spacing between each wire and the associated plate is substantially uniform. Thus, upon rotation of the rotor, the mutual inductance effects of each wire and the associated plate are additive.

Figure 34:
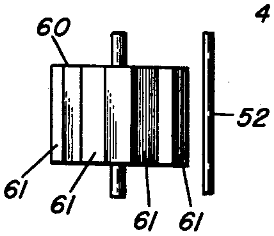
Figures 34 and 35 are, respectively, side and end elevations showing an arrangement of rotor and pickup wherein the over-all inductance of the loop is very low.
Figure 35:
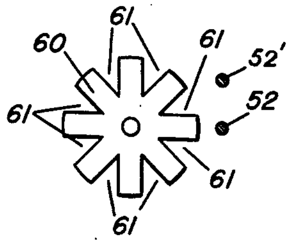
Figure 36:
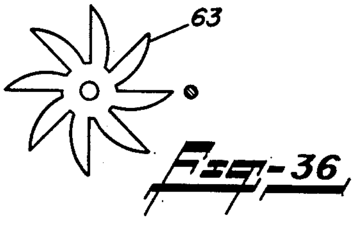
Figure 36 is an end elevation of a rotor provided with shaped-tooth members to vary the character of the wave form.

It may be desirable, in rotating type generators, to make the spaces between relatively large rotor segments act as the wave form generators, thereby making the over-all inductance of the loop very low. Such an arrangement is shown in Figures 34 and 35 wherein the rotor 60 comprises a metal cylinder provided with radial cuts 61. Here, the coupling between the rotor and the loop wire 52 (or wires) is high and the loop inductance is low, making the R. F. oscillator frequency high. As the cuts in the rotor scan the loop, however, the mutual inductance decreases sharply, the eddy currents in the conducting rotor reduce sharply, and the oscillator frequency increases sharply. Shaping the rotor cuts will, of course, alter the wave form of the A. F. frequency modulation and, thus, the quality of the output tones. Figure 36 illustrates, by way of example, one such shaping of the rotor 63.

It will be understood that a series of rotors may be associated with a single conductor loop that spans the full complement of the rotors. If the number of teeth on specific rotors, and the rotatory speeds of the rotor, are properly chosen to correspond to the frequencies of individual notes in a musical scale, a scale of musical tone generators is made available. In such case, the tones for each individual generator may be made keyable by an arrangement wherein the individual rotors operate on continuously rotating shafts but the rotors remain stationary until they are individually coupled to the shaft by a clutch operated mechanically, or electrically, by the depressed playing key or keys.

It is again pointed out that a conductive loop pickup of the type described hereinabove is especially well suited for the generation of Fourier series related partials, when such loop is located at a point of maximum cyclic velocity of a vibrator and very near to that vibrator since its magnetic field is most highly concentrated close to the conductor carrying the R. F. current. A coil, such as that shown in my United States Patent No. 2,273,975, above referred to, has a relatively very widely dispersed magnetic field, so that the translating efficiency of such coil is relatively low, even when used with the mechanical arrangements disclosed herein.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A musical instrument comprising a series of tuned vibrators of conducting material, a pair of parallel-disposed conductors forming an inductive loop spaced from and extending transversely along the series of vibrators, a radio frequency oscillator source connected to the loop and having a natural frequency of oscillations determined by the inductance of the loop when the vibrators are in the at-rest positions, a demodulator for demodulating the modulations of the oscillator frequency brought about by changes in the inductance of the loop in response to vibrations of the vibrators, an amplifier for amplifying the output of the demodulator and an electro-acoustic transducer responsive to the amplifier output.

2. The invention as recited in claim 1, wherein the vibrators comprise metallic reeds having normal, at-rest positions resulting in zero mutual inductance between the reeds and the loop.

3. A musical instrument comprising a series of electrically conductive tuned vibrators disposed in an approximate plane to which their vibrations are substantially normal; a conductor spaced from and extending along the series of vibrators and having with each vibrator mutual inductance, through which upon the flow of radio-frequency current in said conductor eddy currents are generated in the vibrator and which is vibratorily varied by the vibrator vibration; a second conductor connected with said first-mentioned conductor to form therewith a loop whose inductance is influenced by the mutual inductance between said first-mentioned conductor and each of the vibrators; a radio-frequency oscillator system passing radio-frequency current through said loop and with which said loop is connected in a position wherein the inductance of the loop influences a characteristic of the oscillations in said system whereby such oscillations are modulated in accordance with the vibratory loop-inductance variations; and a demodulator connected with said system at a position whereat the modulated oscillations appear for receiving and demodulating the oscillations.

4. A musical instrument comprising a series of electrically conductive tuned vibrators disposed in an approximate plane to which their vibrations are substantially normal; a conductor spaced from and extending along the series of vibrators and having with each vibrator mutual inductance, through which upon the flow of radio-frequency current in said conductor eddy currents are generated in the vibrator and which is vibratorily varied by the vibrator vibration; a second conductor connected with said first-mentioned conductor to form therewith a loop whose inductance is influenced by the mutual inductance between said first-mentioned conductor and each of the vibrators; a radio-frequency oscillator system passing radio-frequency current through said loop and with which said loop is connected in a position wherein the inductance of the loop influences the frequency of the oscillations in said system whereby such oscillations are frequency-modulated in accordance with the vibratory loop-inductance variations; and a demodulator connected with said system at a point whereat the frequency-modulated oscillations appear for receiving and demodulating the oscillations.

5. A musical instrument comprising a series of electrically conductive tuned vibrators disposed in an approximate plane to which their vibrations are substantially normal; a pair of conductors spaced from and extending along the series of vibrators respectively above and below said plane and together forming a loop having with each vibrator mutual inductance, through which upon the flow of radio-frequency current in said loop eddy currents are generated in the vibrator and which is vibratorily varied by the vibrator vibration, said loop having an inductance influenced by the mutual inductance between the loop and each of the vibrators; a radio-frequency oscillator system passing radio-frequency current through said loop and with which said loop is connected in a position wherein the inductance of the loop influences a characteristic of the oscillations in said system whereby such oscillations are modulated in accordance with the vibratory loop-inductance variations; and a demodulator connected with said system at a position whereat the modulated oscillations appear for receiving and demodulating the oscillations.

6. A musical instrument comprising a series of electrically conductive tuned vibrators disposed in an approximate plane to which their vibrations are substantially normal; a pair of conductors spaced from and extending along the series of vibrators respectively above and below said plane and together forming a loop having with each vibrator mutual inductance, through which upon the flow of radio-frequency current in said loop eddy currents are generated in the vibrator and which is vibratorily varied by the vibrator vibration, said loop having an inductance influenced by the mutual inductance between the loop and each of the vibrators; a radio-frequency oscillator system passing radio-frequency current through said loop and with which said loop is connected in a position wherein the inductance of the loop influences the frequency of the oscillations in said system whereby such oscillations are frequency-modulated in accordance with the vibratory loop-inductance variations; and a demodulator connected with said system at a point whereat the frequency-modulated oscillations appear for receiving and demodulating the oscillations.

UNITED STATES PATENTS

References Cited in the file of this patent 1,819,487 Smale ---------------- Aug. 18, 1931

(Other references on following page)

UNITED STATES PATENTS

| | | |
|---|---|---|
| 1,909,414 | Matte | May 16, 1933 |
| 2,263,973 | O'Brien | Nov. 25, 1941 |
| 2,435,487 | Adler | Feb. 3, 1948 |
| 2,441,464 | Albright | May 11, 1948 |
| 2,444,218 | Carnahan | June 29, 1948 |
| 2,455,567 | Armond | Dec. 7, 1948 |
| 2,455,575 | Fender et al. | Dec. 7, 1948 |

| | | |
|---|---|---|
| 2,486,545 | Alvarez | Nov. 1, 1949 |
| 2,488,927 | Owens | Nov. 22, 1949 |
| 2,494,438 | Gilbert | Jan. 10, 1950 |
| 2,542,271 | Alvarez | Feb. 20, 1951 |
| 2,574,647 | Lorenzen | Nov. 13, 1951 |

FOREIGN PATENTS

| | | |
|---|---|---|
| 904,290 | France | Oct. 31, 1945 |